US012461478B2

(12) United States Patent
Takahashi et al.

(10) Patent No.: US 12,461,478 B2
(45) Date of Patent: Nov. 4, 2025

(54) IMAGE FORMING SYSTEM

(71) Applicant: FUJIFILM Business Innovation Corp., Tokyo (JP)

(72) Inventors: Kohei Takahashi, Kanagawa (JP); Tomoaki Yoshioka, Kanagawa (JP); Kota Tomioka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 472 days.

(21) Appl. No.: 17/982,418

(22) Filed: Nov. 7, 2022

(65) Prior Publication Data

US 2023/0418204 A1 Dec. 28, 2023

(30) Foreign Application Priority Data

Jun. 28, 2022 (JP) ................................ 2022-103397

(51) Int. Cl.
*B65H 29/38* (2006.01)
*G03G 15/00* (2006.01)

(52) U.S. Cl.
CPC ......... *G03G 15/6594* (2013.01); *B65H 29/38* (2013.01); *G03G 15/6558* (2013.01); *G03G 15/657* (2013.01); *B65H 2404/53* (2013.01); *B65H 2801/03* (2013.01); *G03G 2215/00409* (2013.01); *G03G 2215/00447* (2013.01)

(58) Field of Classification Search
CPC ........... G03G 15/6594; G03G 15/6558; G03G 15/657; G03G 2215/00409; G03G 2215/00447; B65H 29/38; B65H 2404/53; B65H 2801/03
See application file for complete search history.

(56) References Cited

U.S. PATENT DOCUMENTS

| | | | | |
|---|---|---|---|---|
| 4,144,808 | A | 3/1979 | Iwasa et al. | |
| 6,146,805 | A | 11/2000 | Yoshimura et al. | |
| 2005/0206068 | A1 | 9/2005 | Sasaki et al. | |
| 2013/0271547 | A1* | 10/2013 | Umetsu | G03G 21/00 347/179 |
| 2017/0001381 | A1 | 1/2017 | Suzuki et al. | |
| 2017/0160688 | A1* | 6/2017 | Kurohata | B65H 7/02 |

FOREIGN PATENT DOCUMENTS

| | | | |
|---|---|---|---|
| EP | 3007420 | * | 4/2016 |
| JP | 3292954 | | 6/2002 |
| JP | 6900650 | | 7/2021 |
| WO | WO2004/086150 | * | 10/2004 |

OTHER PUBLICATIONS

"Search Report of Europe Counterpart Application", issued on Nov. 16, 2023, pp. 1-9.

* cited by examiner

*Primary Examiner* — Thomas A Morrison
(74) *Attorney, Agent, or Firm* — JCIPRNET

(57) ABSTRACT

An image forming system includes: a transfer unit that transfers an image onto an object; a transporter that transports the object in the horizontal direction; a raising/lowering unit that raises and lowers the object in the vertical direction; and a processor configured to: after height adjustment performed by the raising/lowering unit, if the object has a top whose height is greater than a predetermined height when the object is to be transported to the transfer unit, stop the transport of the object to the transfer unit.

3 Claims, 17 Drawing Sheets

IMAGE FORMING SYSTEM

CROSS-REFERENCE TO RELATED APPLICATIONS

This application is based on and claims priority under 35 USC 119 from Japanese Patent Application No. 2022-103397 filed Jun. 28, 2022.

BACKGROUND

(i) Technical Field

The present disclosure relates to an image forming system.

(ii) Related Art

In recent years, images may be printed, for example, on metal, glass, and tile (hereinafter referred to as “objects”). These objects have various thicknesses and shapes. These objects possess high rigidness, and are not possible to be deformed freely like paper. Therefore, for example, these objects are transported horizontally to a transfer unit where images are transferred.

A technique of the related art is disclosed in Japanese Patent No. 3292954.

For example, if the thickness of an object exceeds the acceptable height for handling, such an object, which is being transported, may collide against a transfer belt, resulting in damage to the transfer belt.

SUMMARY

Aspects of non-limiting embodiments of the present disclosure relate to a technique for reducing a probability of damage to a transfer unit which is caused by an object that is being transported and that passes through the transfer unit, compared with the case in which the height of the top of the object is not detected before the transport operation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming system comprising: a transfer unit that transfers an image onto an object; a transporter that transports the object in a horizontal direction; a raising/lowering unit that raises and lowers the object in a vertical direction; and a processor configured to: after height adjustment performed by the raising/lowering unit, if the object has a top whose height is greater than a predetermined height when the object is to be transported to the transfer unit, stop the transport of the object to the transfer unit.

BRIEF DESCRIPTION OF THE DRAWINGS

Exemplary embodiments of the present disclosure will be described in detail based on the following figures, wherein.

DETAILED DESCRIPTION

Figure 1:
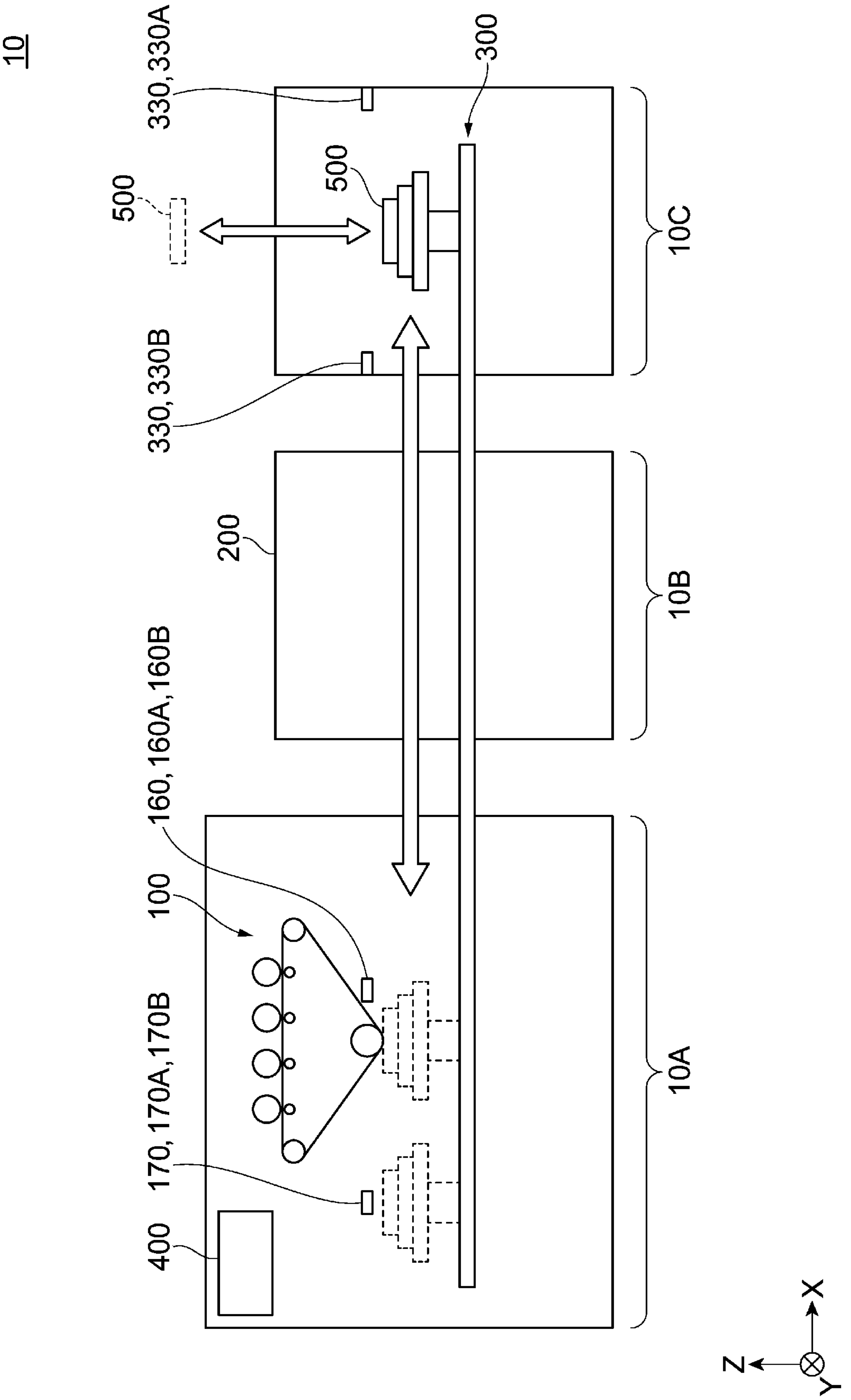
FIG. 1 is a diagram for describing a schematic configuration of an image forming apparatus which is assumed in a first exemplary embodiment.

Referring to the drawings, exemplary embodiments of the present disclosure will be described below.

First Exemplary Embodiment

Image Forming Apparatus

FIG. 1 is a diagram for describing a schematic configuration of an image forming apparatus 10 which is assumed in a first exemplary embodiment. The image forming apparatus 10 is an exemplary image forming system.

In the first exemplary embodiment, an object to be printed on is referred to as a medium 500. The material of a medium 500 is, for example, metal, glass, tile, ceramic, or wood, and has a standardized size. That is, the image forming apparatus 10 in the first exemplary embodiment forms images, one by one, on the surfaces of media 500 having the same material and shape. FIG. 1 illustrates the case of a flat-shaped medium 500.

In the first exemplary embodiment, a length in the Z-axis direction in the figures is referred to as a “height” or “thickness”; transporting a medium 500 in the Z-axis direction is referred to as “raising/lowering”.

A plane defined by the X axis and the Y axis in the figures is horizontal to the floor. In the first exemplary embodiment, transporting a medium 500 in the X-axis direction is referred to as “transporting in the horizontal direction”.

The image forming apparatus 10 illustrated in FIG. 1 includes three housings 10A, 10B, and 10C. The image forming apparatus 10 may appear as if it has a single housing.

The housing 10A contains a transfer unit 100 and a processing unit 400. The housing 10B contains a fixing unit 200. The housing 10C is provided to take in and out a medium 500. To do this, an opening (not illustrated) is disposed on the top surface of the housing 10C.

The image forming apparatus 10 includes a transporter 300 which extends across the three housings 10A, 10B, and 10C. The transporter 300 is an exemplary transporter.

The transfer unit 100 transfers, onto a medium 500, an image formed by using toner or powder particles. That is, the transfer unit 100 in the first exemplary embodiment forms an image by using an electrophotographic system.

The transfer unit 100 has two types of height sensors 160 and 170 attached thereto. The height sensors 160 and 170 will be described in detail below.

The fixing unit 200 heats toner or the like, which has been transferred by the transfer unit 100, to fix the toner or the like onto the surface of the medium 500. The first exemplary embodiment employs a contactless heating system. In the first exemplary embodiment, a heat source is used to heat the surface of a medium 500 and the toner or the like at the same time.

The housing 10C has a height sensor 330 attached thereto. The height sensor 330 will be also described in detail below.

Each of the height sensors 160, 170, and 330 is an exemplary detecting unit which detects the height of the top of a medium 500.

The Configuration of the Transfer Unit 100

Figure 2:
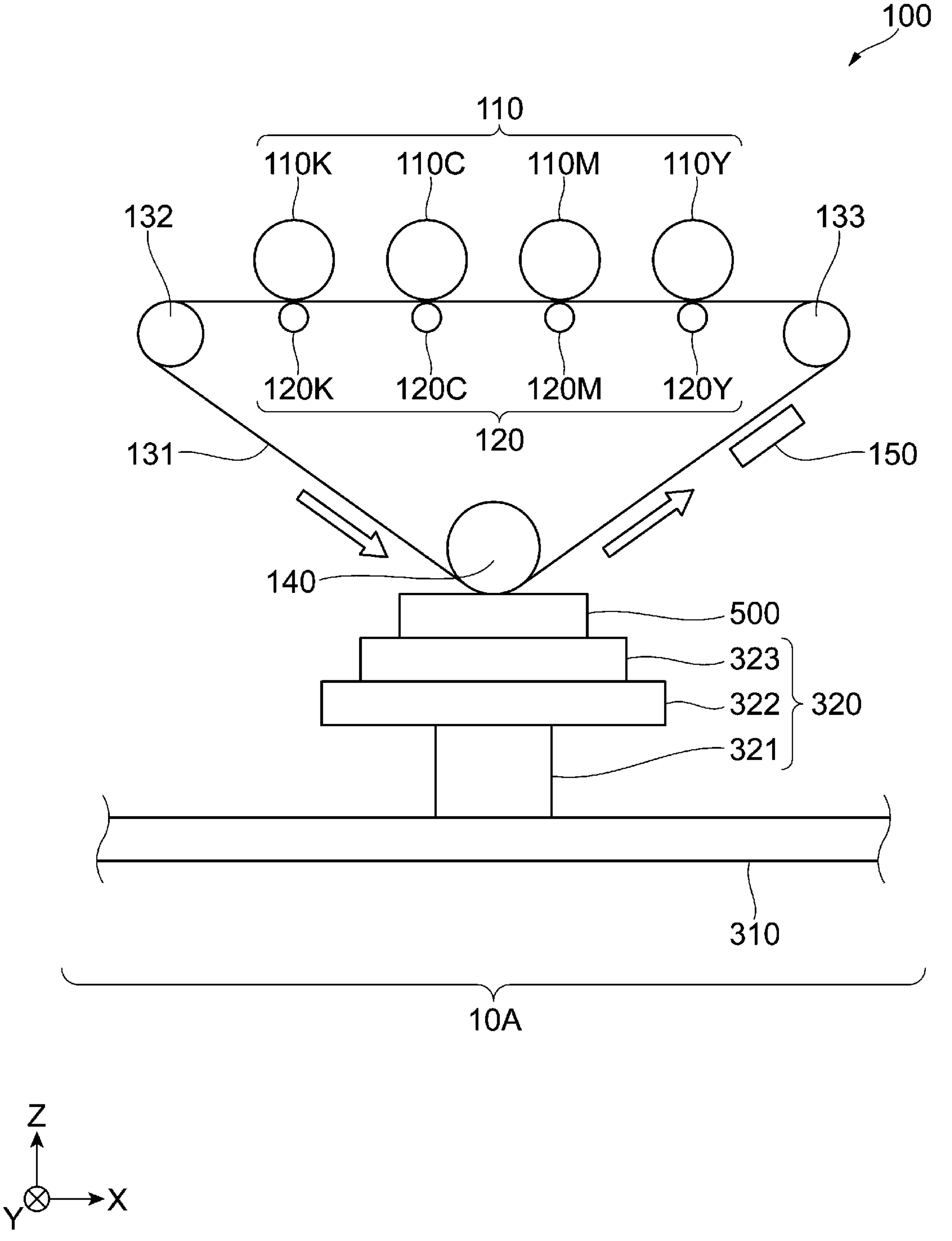
FIG. 2 is a diagram illustrating an exemplary configuration of a transfer unit.

FIG. 2 is a diagram illustrating an exemplary configuration of the transfer unit 100. The transfer unit 100 forms an image with charged particles, and generates an electric field to transfer the image onto a medium 500.

The transfer unit 100 includes developing devices 110, first-transfer rolls 120, and an intermediate transfer belt 131. The intermediate transfer belt 131, which is stretched around driving rolls 132 and 133 and a backup roll 140, travels cyclically.

Additionally, the transfer unit 100 has a cleaning device 150 which removes particles having been attached to the intermediate transfer belt 131.

Each developing device 110 is a unit which forms an electrostatic latent image of an image on its photoreceptor, and which attaches charged particles to the electrostatic latent image on the photoreceptor to develop the image. The developing devices 110 illustrated in FIG. 2 support four colors, which are black as well as three colors of yellow, magenta, and cyan.

In FIG. 2, units corresponding to the colors of yellow, magenta, cyan, and black are labeled with Y, M, C, and K indicating the respective colors. When the colors are not necessary to be discriminated, the units are not labeled with Y, M, C, and K.

The first-transfer rolls 120 are used to transfer, onto the intermediate transfer belt 131, images formed on the developing devices 110. The transfer using the first-transfer rolls 120 is called "first transfer".

The first-transfer rolls 120 are disposed so as to be opposite the respective developing devices 110 with the intermediate transfer belt 131 interposed in between. The first-transfer rolls 120 bring the outer surface of the intermediate transfer belt 131 in contact with the developing devices 110.

The first-transfer rolls 120 are provided for the respective developing devices 110Y, 110M, 110C, and 110K. FIG. 2 illustrates the first-transfer rolls 120, which correspond to the respective colors, with the labels of 120Y, 120M, 120C, and 120K.

In FIG. 2, the intermediate transfer belt 131 travels in the direction indicated by the arrow (that is, the counterclockwise direction). For example, either one or both of the driving rolls 132 and 133 cause the intermediate transfer belt 131 to travel.

In FIG. 2, images formed by the developing devices 110 are transferred onto the outer surface of the intermediate transfer belt 131. That is, the intermediate transfer belt 131 holds formed images. Hereinafter, the outer surface of the intermediate transfer belt 131 is referred to as a "transfer surface".

In the configuration illustrated in FIG. 2, the intermediate transfer belt 131 passes the developing devices 110Y, 110M, 110C, and 110K sequentially so that a multicolor image, in which yellow, magenta, cyan, and black are stacked on the transfer surface from the bottom layer in this sequence, is formed.

The backup roll 140 is a roller which brings the transfer surface of the intermediate transfer belt 131 in contact with a medium 500 to transfer the image onto the surface of the medium 500. The transfer using the backup roll 140 is called "second transfer".

In second transfer, a predetermined voltage is applied to the backup roll 140. Application of the voltage causes an electric field (hereinafter referred to as a "transfer electric field") to occur between the backup roll 140 and a medium 500 so that the image formed with charged particles is transferred from the intermediate transfer belt 131 to the medium 500.

Thus, transfer of an image from the intermediate transfer belt 131 to a medium 500 needs a current which flows from the backup roll 140 through the intermediate transfer belt 131 to the medium 500.

When a medium 500 is a conductor such as metal, since a current flows through the medium 500 itself, an image is transferred onto the surface of the medium 500 through occurrence of a transfer electric field.

In contrast, when a medium 500 is a nonconductor, an image is not transferred onto the surface of the medium 500 unless additional configuration is provided. Therefore, when a medium 500 is a nonconductor, a layer (hereinafter referred to as a "conductive layer") of a conductive member is formed in advance at least in a portion, in which an image is to be formed, to provide a path through which a current flows. Thus, an image may be also transferred onto a nonconductor.

The procedure of image transfer using the intermediate transfer belt 131 will be described simply.

Images of the colors are sequentially transferred onto the transfer surface of the intermediate transfer belt 131 passing the developing devices 110Y, 110M, 110C, and 110K. As a result, a multicolor image is held on the transfer surface of the intermediate transfer belt 131.

When the intermediate transfer belt 131 further rotates, the multicolor image held on the transfer surface of the intermediate transfer belt 131 reaches the position (hereinafter referred to as the "transfer position") where the multicolor image is in contact with a medium 500.

In this state, when the voltage is applied to the backup roll 140 and a transfer electric field occurs, the image is transferred from the intermediate transfer belt 131 to the medium 500.

The cleaning device 150 is a unit which removes particles remaining on the transfer surface of the intermediate transfer belt 131 which has passed the transfer position.

The cleaning device 150 is disposed between the transfer position and the developing device 110Y in the rotation direction of the intermediate transfer belt 131. In other words, the cleaning device 150 is disposed downstream of the transfer position and upstream of the developing device 110Y.

Removal of particles by the cleaning device 150 provides preparation for the next cycle. That is, transfer of a new image onto the transfer surface is ready.

The Configuration of the Transporter 300

An exemplary configuration of the transporter 300 which transports a medium 500 will be described.

As described above, the image forming apparatus 10 in the first exemplary embodiment is used to form images on media 500 having various thicknesses. Therefore, the height of the mounting surface on the transporter 300 side needs to be adjusted.

Thus, the transporter 300 in the first exemplary embodiment has a mechanism for raising/lowering a medium 500 in the vertical direction in addition to a mechanism for transporting a medium 500 in the horizontal direction.

In FIG. 2, the transporter 300 (see FIG. 1) includes a transport rail 310 which defines a transport path for a medium 500, and a mount 320 which moves along the transport rail 310.

The mount 320 has a leg 321 which moves along the transport rail 310, and a pedestal 322 on which a medium 500 is mounted. Among these, the leg 321 has a mechanism for raising/lowering the pedestal 322 in the vertical direction. In this sense, the leg 321 is an exemplary transporter and an exemplary raising/lowering unit. In a broad sense, the leg 321 and the pedestal 322 are referred to as a transporter.

On the pedestal 322, a medium 500 may be mounted directly, or a jig 323 may be mounted. The jig 323 is a member used to hold a medium 500, and is mounted on the mounting surface of the pedestal 322 for use. Therefore, the jig 323 may be freely attached to/detached from the mounting surface of the pedestal 322.

The transport rail 310 is installed through the three housings 10A to 10C.

The transport rail 310 has one end portion disposed in the housing 10C where a transport operation starts and where a transport operation ends. The transport rail 310 has the other end portion disposed in the housing 10A in which the transfer unit 100 is disposed.

The mount 320, on which a medium 500 is mounted, is transported from the housing 10C, in which one end portion is present, to the housing 10A, in which the other end portion is present. In the transport operation, an operation of adjusting the height of the top of the medium 500 to the elevation of the intermediate transfer belt 131 is also performed. The end portion of the transport rail 310 in the housing 10A is spaced apart from the transfer position by a predetermined distance. The distance refers to a minimum distance necessary to accelerate the mount 320, which is in the halt state, to a target speed. Actually, the speed of the mount 320 needs to be maintained at the target speed. Thus, not only the distance for acceleration but also the distance for checking if the mount 320 moves at the target speed is necessary. The target speed is the traveling speed of the intermediate transfer belt 131.

After the mount 320, which starts moving from the end portion in the housing 10A, passes the transfer unit 100, the mount 320 is transported to the fixing unit 200. The fixing unit 200 fixes the image which has been transferred onto the medium 500. After completion of the fixing, the mount 320 is transported to the housing 10C. The medium 500, on which the image has been formed, is taken out through the opening provided for the housing 10C.

The mechanism for implementing a move of the mount 320 along the transport rail 310 is not particularly limited to this configuration. For example, a configuration in which the leg 321 provided with a motor or another driving device moves by itself may be employed. Alternatively, a motor or another driving device which pulls the leg 321 may be provided for the transport rail 310.

In addition, the mechanism for raising/lowering the pedestal 322 is not limited to this configuration. For example, a configuration in which a rack and pinion and a motor are used to raise/lower the pedestal 322 may be provided for the leg 321. A gear or another mechanism which is interlocked with the elevation of the pedestal 322 may be provided for the leg 321, and the elevation of the pedestal 322 may be adjusted manually.

In height adjustment using a motor or another driving device, information about the height of the mounting surface which is specified by a user may be used, or information about the thickness of a medium 500 which is input by a user may be used. Alternatively, a sensor output may be used. The sensor output includes output of a relative height with respect to a reference height, and information such as a pressure and a distortion which are applied to the leg 321 when a medium 500 is pressed against the intermediate transfer belt 131.

The pedestal 322 may be provided, for example, with a groove, a protrusion, or a fastener which is used to position a medium 500 or the jig 323. These are exemplary structures or mechanisms for positioning. A combination of these may be provided for the pedestal 322.

For example, when the pedestal 322 is provided with a fastener, the jig 323 may be fixed to the mounting surface regardless of the shape of the jig 323. The fastener makes an integral unit constituted by the jig 323 and the pedestal 322, achieving reduction of transfer misalignment of an image.

In addition, the pedestal 322 is mounted so as to be able to rise and fall with respect to the leg 321 in accordance with a pressure from above. A mechanism for enabling the pedestal 322 to rise and fall is implemented, for example, by disposing a rubber, a spring, or another elastic body in a joint portion between the pedestal 322 and the leg 321. Employment of this kind of configuration causes an impact, which occurs when a medium 500 comes in contact with the intermediate transfer belt 131 of the transfer unit 100, to be softened.

The jig 323 is a tool attached to the pedestal 322 when necessary. The jig 323 has a shape, a structure, and a mechanism in accordance with the structure and the mechanism of the mounting surface of the pedestal 322. For example, a hole for inserting a screw into a tapped hole provided on the mounting surface, a hole for inserting a pin provided on the mounting surface, or a protrusion or a groove for positioning is formed on the bottom surface or a side surface of the jig 323.

A shape, a structure, or a mechanism, which is suitable to hold a medium 500 which is an object to be mounted, is provided on the top surface of the jig 323. A jig 323 may be prepared for each medium 500 which is an object to be mounted, or a jig 323 which may support multiple shapes and sizes may be prepared.

The Configuration of the Fixing Unit 200

The configuration of the fixing unit 200 will be described.

In the first exemplary embodiment, both a medium 500 before transfer of an image and a medium 500 after transfer of an image pass through the fixing unit 200.

Figure 3:
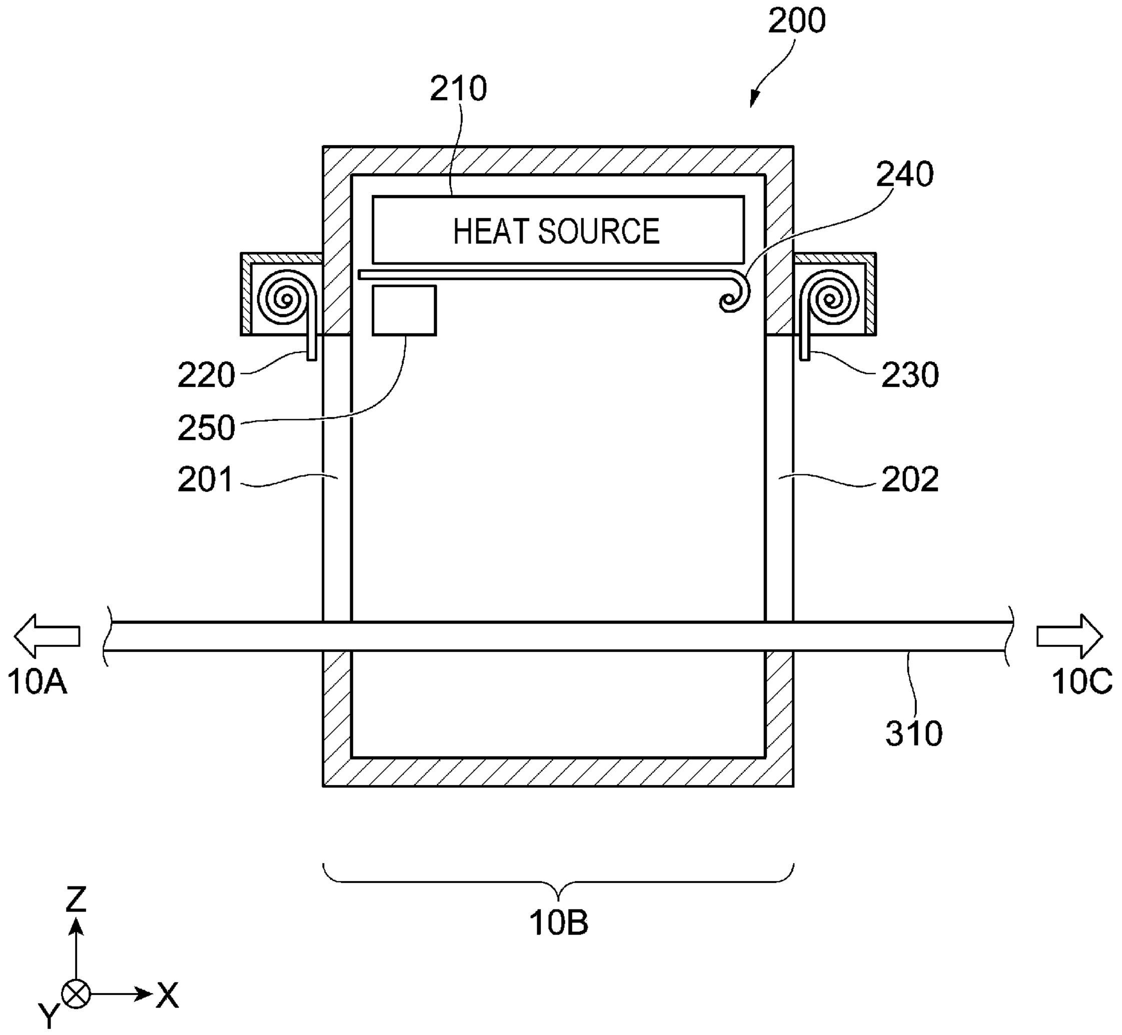
FIG. 3 is a diagram for describing an exemplary configuration of a fixing unit.

FIG. 3 is a diagram for describing an exemplary configuration of the fixing unit 200. FIG. 3 illustrates the case in which openings 201 and 202, which are doorways of the housing 10B, are open.

The opening 201 is opened when a medium 500 is taken in/out between the housing 10A and the housing 10B, and is closed when a transferred image is to be fixed onto a medium 500.

The opening 202 is opened when a medium 500 is taken in/out between the housing 10C and the housing 10B, and is closed when a transferred image is to be fixed onto a medium 500.

In FIG. 3, a roll-up shutter 220 serving as an opening/closing member is attached to the opening 201. A roll-up shutter 230 serving as an opening/closing member is attached to the opening 202. In FIG. 3, the openings 201 and 202 are open. Thus, both the roll-up shutters 220 and 230 are rolled up. When the openings 201 and 202 are closed, the end portions of the shutters 220 and 230 are pulled out to positions near the transport rail 310.

When a medium 500 is transported into the fixing unit 200 to fix an image, only the shutter 220 on the opening 201 side is opened, and the shutter 230 of the opening 202 on the opposite side remains closed. Thus, a decrease of the temperature in the fixing unit 200 is reduced. In contrast, when a medium 500 having a fixed image is to be taken out, only the shutter 230 on the opening 202 side is opened, and the shutter 220 of the opening 201 on the opposite side may remain closed or may be opened.

The fixing unit 200 in the first exemplary embodiment employs a contactless heating system. Therefore, images may be fixed onto media 500 (see FIG. 1) having various thicknesses and shapes.

In FIG. 3, a heat source 210 is attached to the ceiling of the fixing unit 200. The heat source 210 may be attached, not limited to the ceiling, to a wall or both the ceiling and a wall.

For example, a halogen lamp, a ceramic heater, or an infrared lamp is used as the heat source 210. In the first exemplary embodiment, particles melted through heating are fixed onto the surface of a medium 500.

In FIG. 3, a roll-up shutter 240 is attached between the heat source 210 and a space (hereinafter referred to as a "heating chamber") through which a medium 500 passes. FIG. 3 illustrates the state in which the roll-up shutter 240 is pulled out, that is, the state in which the heat source 210 is separated from the heating chamber. For the shutter 240, a material having the heat insulation property is used.

In FIG. 3, the heating chamber contains a temperature sensor 250. The ambient temperature measured by the temperature sensor 250 is output to the processing unit 400 (see FIG. 1).

When the ambient temperature in the heating chamber is greater than or equal to a temperature (hereinafter referred to as a "reference value") at which an image may be fixed, a transferred image is fixed onto a medium 500. In contrast, when the ambient temperature is less than the reference value, a transferred image fails to be fixed onto a medium 500. The reference value is influenced, for example, by the type of transferred particles or the thermal conductivity of a medium 500. In fixing an image, not only the ambient temperature but also the time in which a medium 500 stays in the heating chamber is to be considered.

The Configuration of the Processing Unit 400

In the first exemplary embodiment, the processing unit 400 (see FIG. 1) is disposed in the housing 10A (see FIG. 1) in which the transfer unit 100 (see FIG. 1) is disposed. The processing unit 400 may be disposed in the housing 10B in which the fixing unit 200 (see FIG. 1) is disposed, or the housing 10C having the opening through which a medium 500 is taken in/out. The processing unit 400 may be provided for the housings 10A, 10B, and 10C of the image forming apparatus 10 as an external unit, or may be disposed on a network communicatively.

Figure 4:
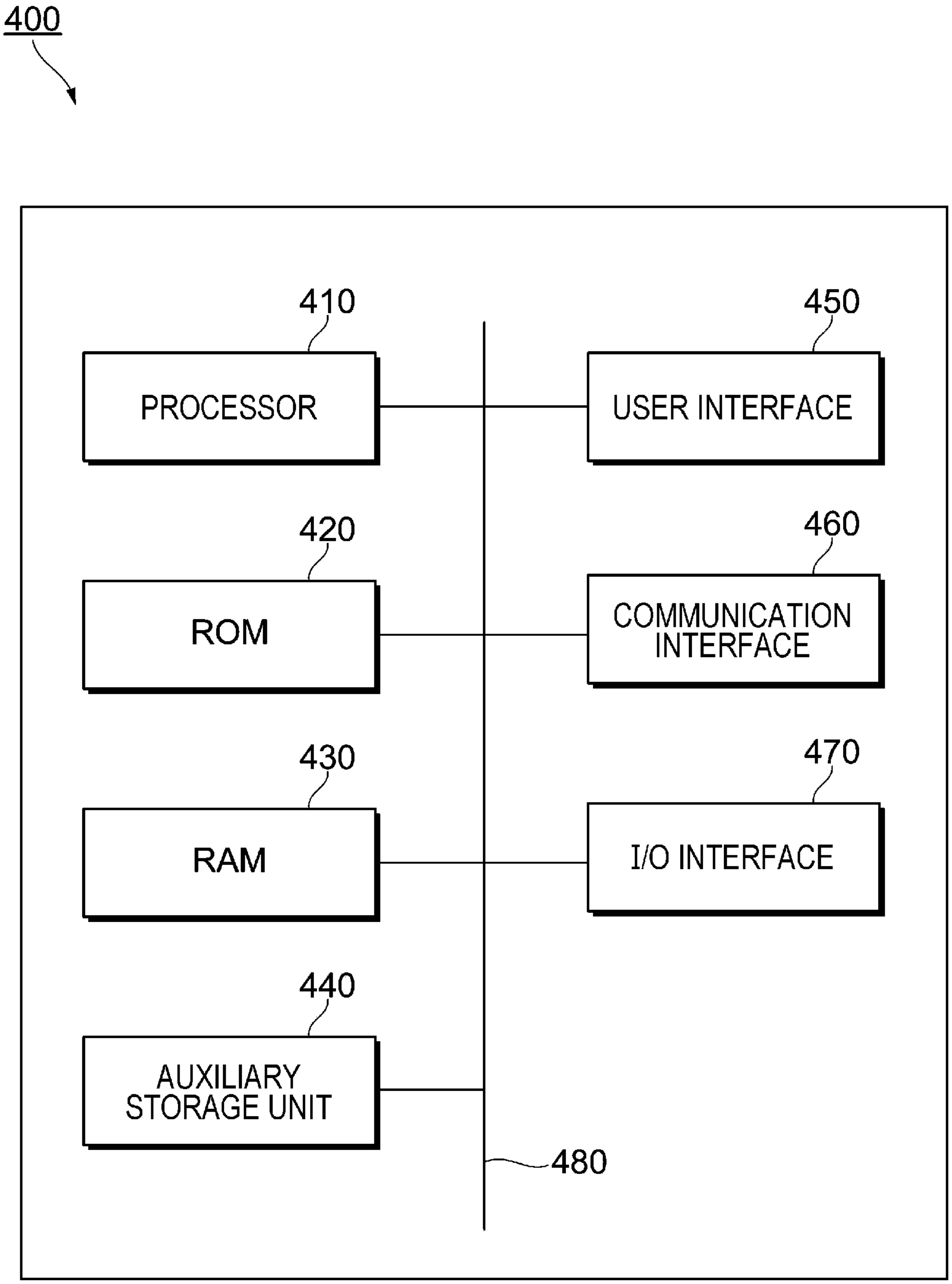
FIG. 4 is a diagram for describing an exemplary configuration of a processing unit.

FIG. 4 is a diagram for describing an exemplary configuration of the processing unit 400.

The processing unit 400 includes a processor 410, a read only memory (ROM) 420 which stores, for example, a basic input output system (BIOS), a random access memory (RAN) 430 which is used as a work area of the processor 410, an auxiliary storage unit 440, a user interface 450, a communication interface 460, and an input/output (I/O) interface 470. The processor 410 is connected to the other devices through a bus or another signal line 480.

The processor 410 is a device for implementing various functions through execution of programs. The processor 410, the ROM 420, and the RAM 430 function as a computer.

The auxiliary storage unit 440 is configured, for example, by a hard disk device or a semiconductor storage. The auxiliary storage unit 440 stores programs and various types of data. A program herein is used as a general term for an operating system (OS), firmware, and an application program.

In the first exemplary embodiment, the auxiliary storage unit 440 is contained in the housing 10A. Alternatively, the auxiliary storage unit 440 may be provided, as an external unit, for the housing 10A through the I/O interface 470, or may be a portable memory which may be attached to and detached from the housing 10A. The auxiliary storage unit 440 may be present on a network connected to the communication interface 460.

The user interface 450 includes, for example, a touch panel, operation buttons, and a speaker which are used in display of an image for operation and in reception of operations. The touch panel is configured by a liquid-crystal display, an organic light-emitting diode (OLED) display, or another display, and an electrostatic-capacity sensor which detects a change in electrostatic capacity.

The communication interface 460 is an interface for communicating with terminals on a network. The communication interface 460 supports various types of communication standards. The communication standards include, for example, Ethernet™, Wi-Fi™, and a mobile communication system.

The I/O interface 470 is an interface for communicating with the transfer unit 100 (see FIG. 1), the fixing unit 200 (see FIG. 1), and the transporter 300 (see FIG. 1).

Operations

Operations performed in the image forming apparatus 10 will be described below by using FIGS. 5A to 16.

Figure 5A:
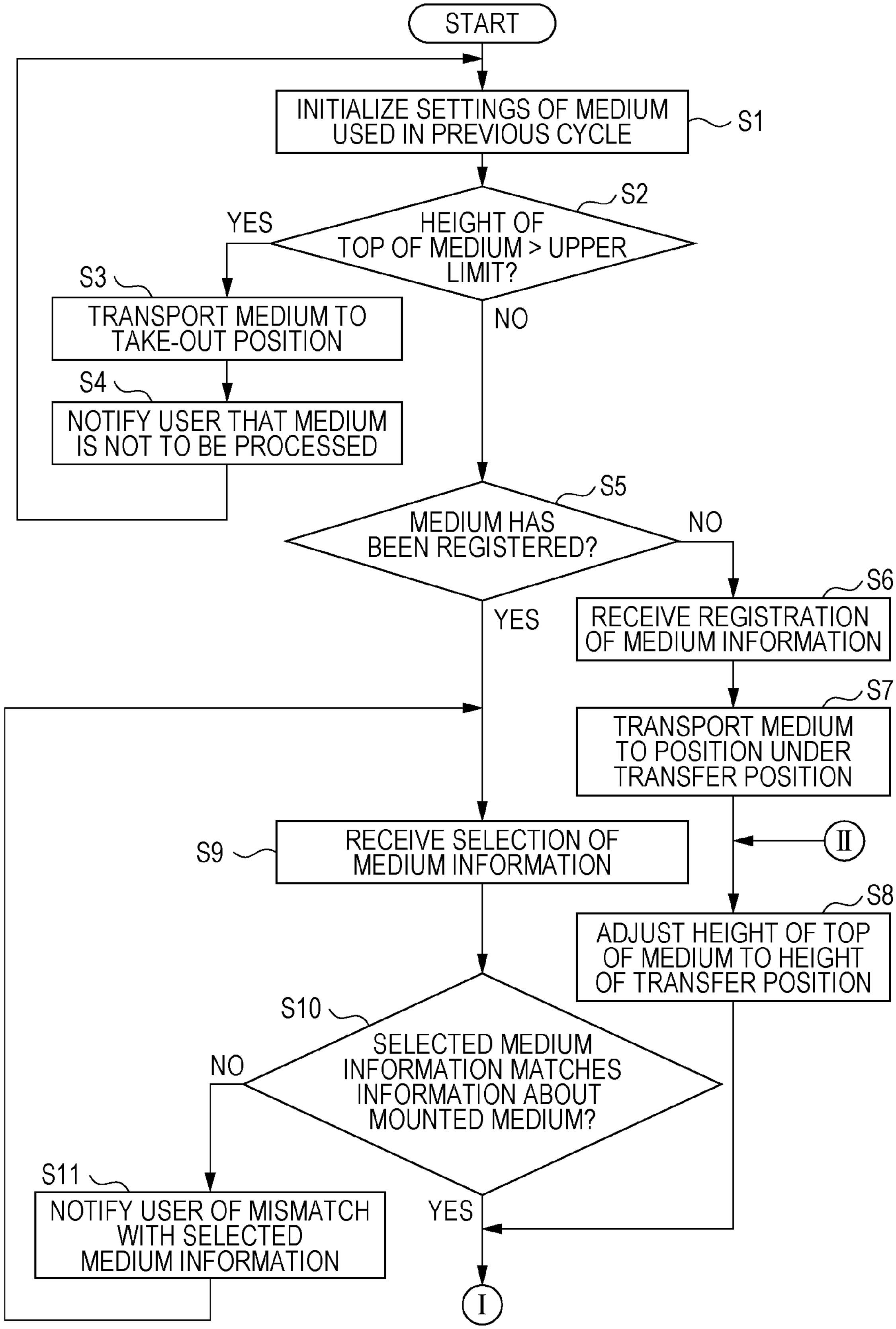
FIGS. 5A and 5B are flowcharts of an exemplary control operation performed by a processor.
Figure 5B:
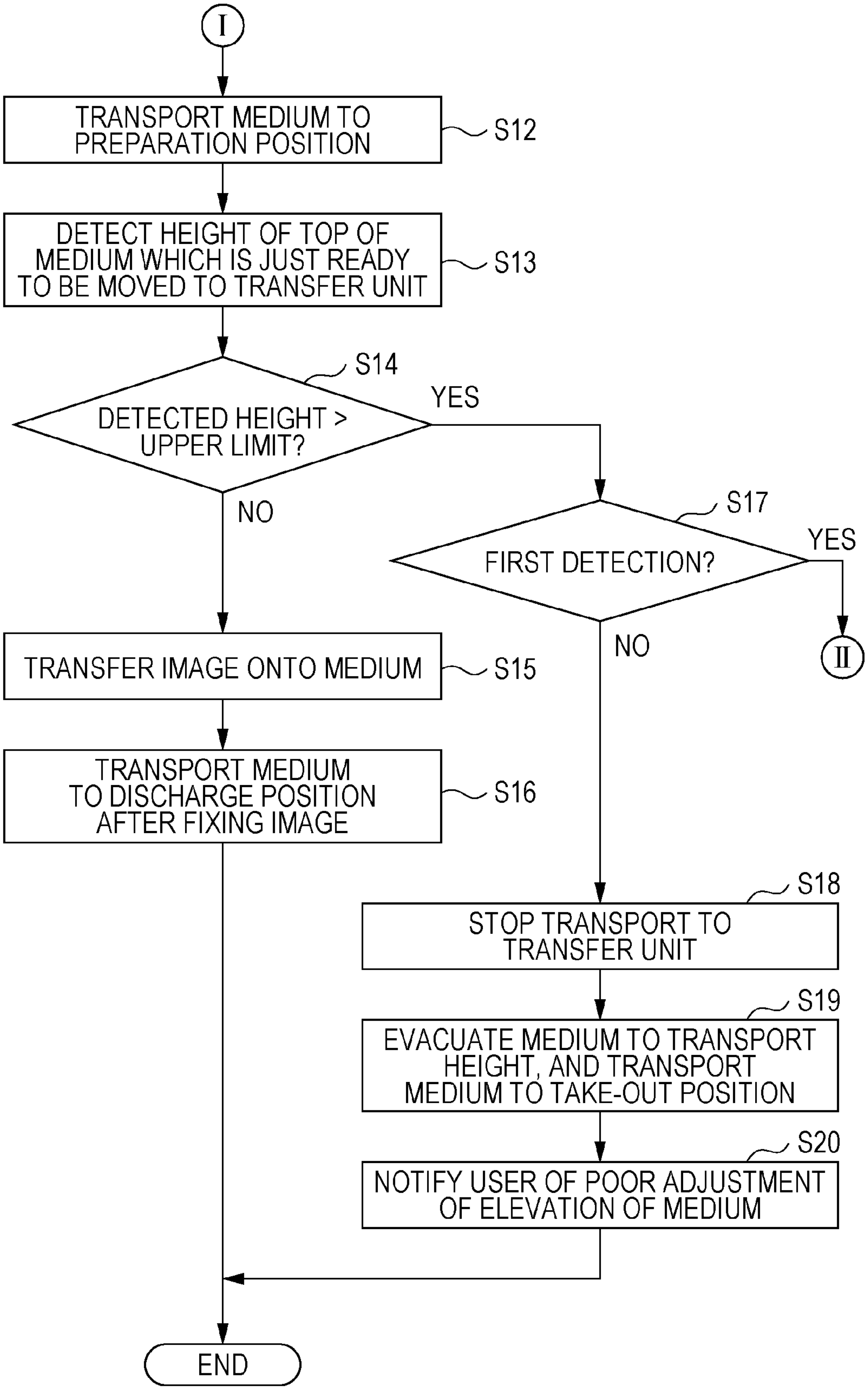

FIGS. 5A and 5B illustrate a flowchart for describing an exemplary control operation performed by the processor 410 (see FIG. 4). The symbol 'S' in FIGS. 5A and 5B means a step.

The processor 410, which has detected that a medium 500 on which an image is to be formed is mounted, initializes the settings of a medium 500 which are used in the previous cycle (step 1).

The processor 410 determines whether the height of the top the medium 500 mounted on the mount 320 (see FIG. 2) exceeds an upper limit (step 2).

Step 2 is a process for determining whether the thickness of the medium 500 mounted on the mount 320 is within a numerical range which may be handled by the image forming apparatus 10.

This is because, if an operation starts in the state in which a received medium 500 has a thickness which is not capable of being handled, this causes a breakdown such as damage to the intermediate transfer belt 131 (see FIG. 2) or the like.

Figure 6:
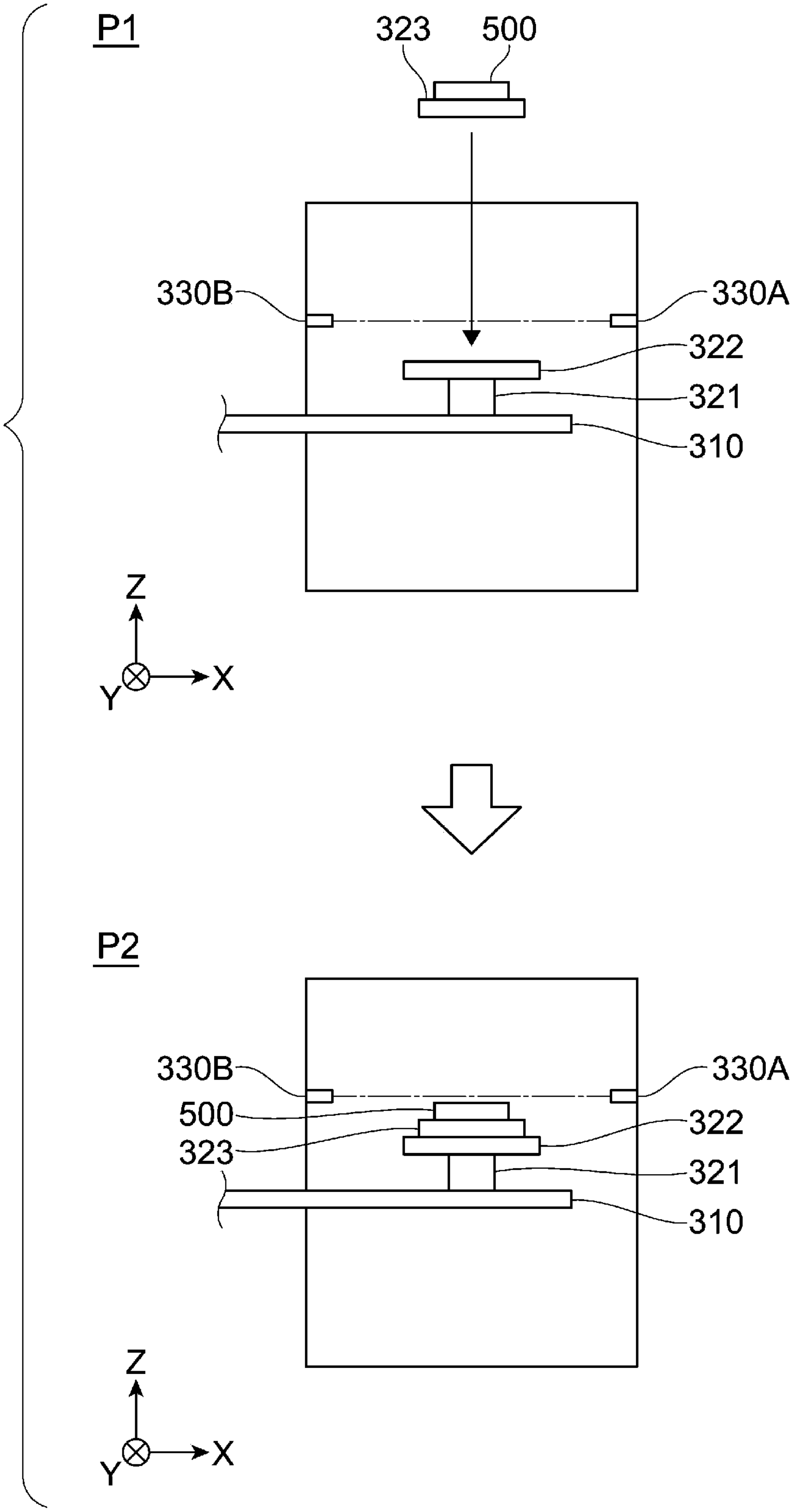
FIG. 6 is a diagram for describing the case in which the thickness of a mounted medium is less than or equal to an upper limit.

FIG. 6 is a diagram for describing the case in which the thickness of a mounted medium 500 is less than or equal to the upper limit.

In process P1, a medium 500 mounted on the jig 323 is attached to the pedestal 322.

The housing 10C contains a light emitting unit 330A and a light receiving unit 330B which constitute the height sensor 330 and which are attached to the housing 10C. In the first exemplary embodiment, for example, a semiconductor laser is used as the light emitting unit 330A; for example, a photodiode is used as the light receiving unit 330B which receives laser light which is output from the light emitting unit 330A. In FIG. 6, the light receiving unit 330B is disposed so as to be opposite the light emitting unit 330A.

As in process P2, when a medium 500 does not block the laser light, it is detected that the thickness of the medium 500 is less than or equal to the upper limit. The upper limit herein is an exemplary predetermined height.

Figure 7:
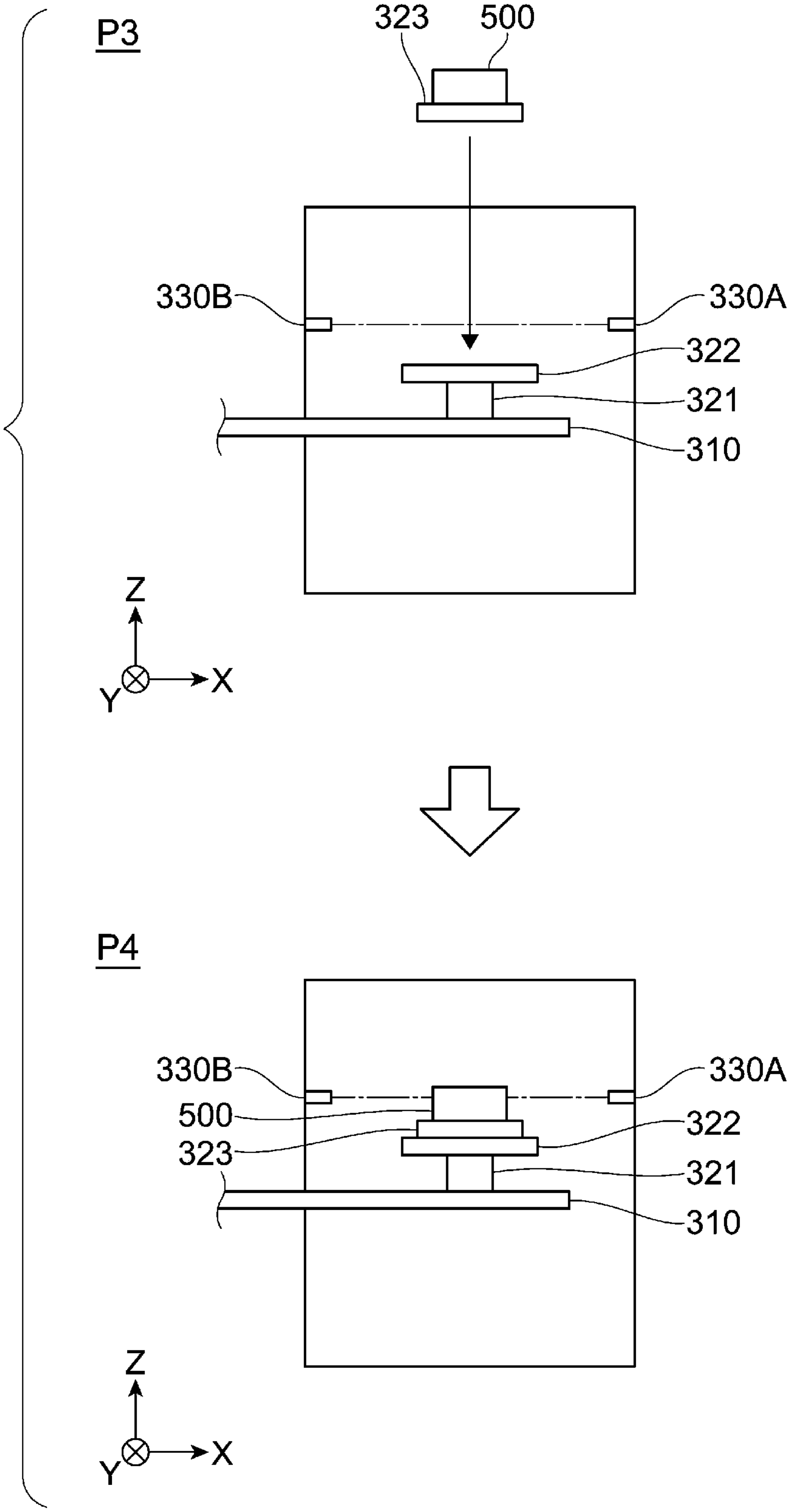
FIG. 7 is a diagram for describing the case in which the thickness of a mounted medium exceeds an upper limit.

FIG. 7 is a diagram for describing the case in which the thickness of a mounted medium 500 exceeds the upper limit. In FIG. 7, parts corresponding to those in FIG. 6 are designated with the corresponding reference numerals.

In process P3, a medium 500 mounted on the jig 323 is attached to the pedestal 322. The thickness of the medium 500 which is assumed in FIG. 7 is greater than that of a medium 500 which is assumed in FIG. 6. Therefore, in process P4, the medium 500 blocks the laser light. That is, the thickness of the medium 500 exceeds the upper limit.

As described above, in the first exemplary embodiment, the height sensor 330 is used to detect whether the height of the top of a medium 500 mounted on the pedestal 322 exceeds the upper limit or is less than or equal to the upper limit.

The description will return to FIGS. 5A and 5B.

As in the example in FIG. 7, when the height of the top of the medium 500 exceeds the upper limit, the processor 410 obtains a positive result in step 2. If this medium 500 is transported in the horizontal direction along the transport rail 310 (see FIG. 2), the intermediate transfer belt 131 or the like may be broken.

Therefore, the processor 410 transports the medium 500 to the take-out position (step 3). For example, the pedestal 322 is raised so that the medium 500 may be taken out.

The processor 410 notifies a user that the medium 500 is not to be processed (step 4).

Figure 8:
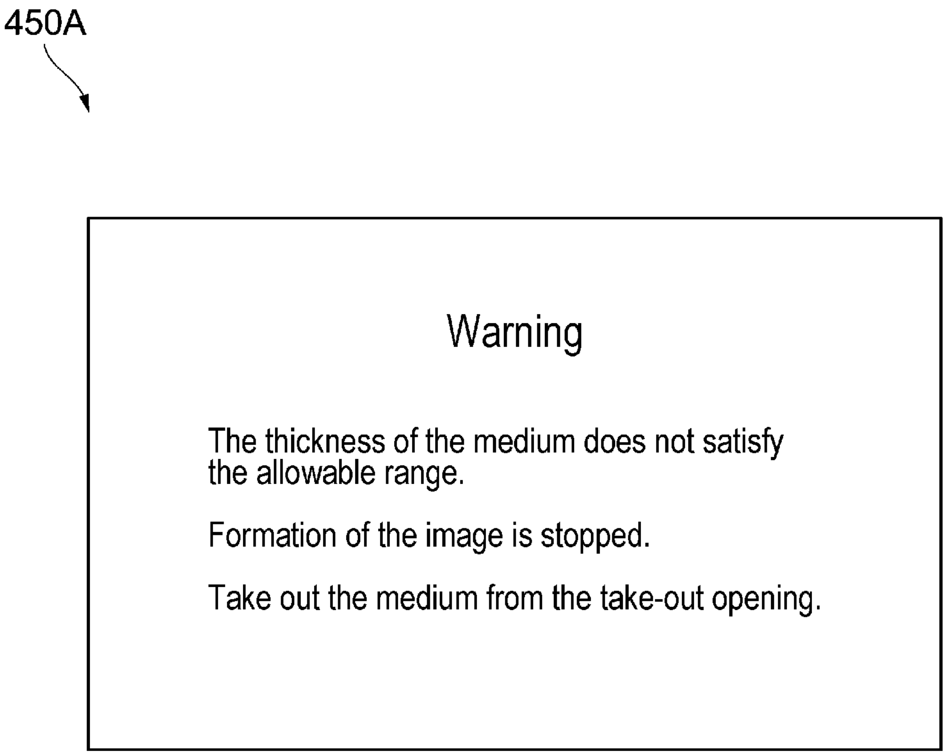
FIG. 8 is a diagram for describing an exemplary notification screen corresponding to step 4 in FIG. 5A.

FIG. 8 is a diagram for describing an exemplary notification screen 450A corresponding to step 4 (see FIG. 5A). The notification screen 450A is displayed, for example, on a display of the housing 10A.

In the example in FIG. 8, following a title, "Warning", messages, "The thickness of the medium does not satisfy the allowable range." "Formation of the image is stopped." "Take out the medium from the take-out opening." are displayed.

The description will return to FIGS. 5A and 5B.

After execution of step 4, the processor 410 returns to step 1. That is, the settings of the medium 500 taken out from the take-out opening are initialized.

In contrast, as in the example in FIG. 6, when the height of the top of the medium 500 does not exceed the upper limit, the processor 410 obtains a negative result in step 2.

In this case, the processor 410 receives selection of whether the medium is of a registered type (step 5).

Figure 9A:
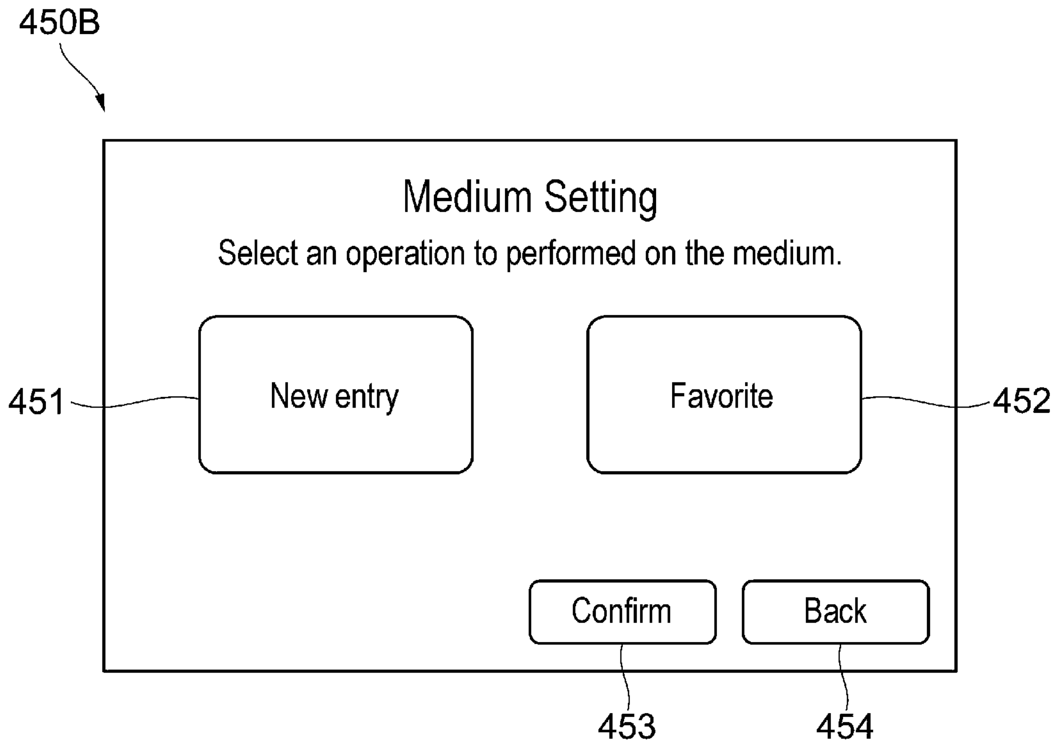
FIGS. 9A and 9B are diagrams for describing exemplary screens used to receive setting for a medium.
Figure 9B:
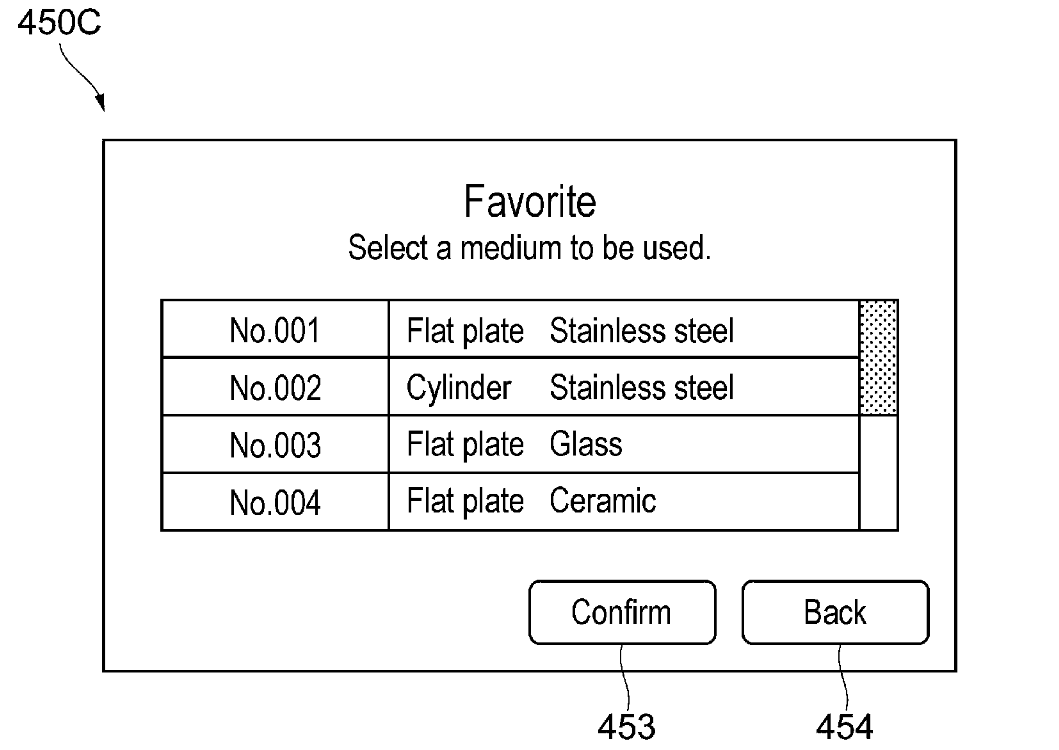

FIGS. 9A and 9B are diagrams for describing exemplary screens 450B and 450C which are used in reception of the setting for the medium 500.

The screen 450B is a home screen having a title, "Medium Setting". In addition, a description about an operation requested to a user is displayed. In the example in FIG. 9A, "Select an operation to be performed on the medium." is displayed.

On the screen 450B, a "New entry" button 451 and a "Favorite" button 452 are displayed, and a "Confirm" button 453, which is used to confirm the selection, and a "Back" button 454 are displayed.

In the case of a medium 500 which has not been printed in the past, after selection of the "New entry" button 451, the "Confirm" button 453 is operated to make a transition to a screen for registering specifications of the medium 500.

In contrast, in the case of a medium 500 which has been printed in the past, after selection of the "Favorite" button 452, the "Confirm" button 453 is operated to make a transition to a screen 450C for selecting the medium 500 which has been used before.

In the screen 450C illustrated in FIG. 9B, a title, "Favorite", is followed by a message, "Select a medium to be used."

In the screen 450C, four types of setting information among the registered media are displayed.

The setting information indicated by "No. 001" is labeled with "Flat plate of stainless steel".

The setting information indicated by "No. 002" is labeled with "Cylinder of stainless steel".

The setting information indicated by "No. 003" is labeled with "Flat plate of glass".

The setting information indicated by "No. 004" is labeled with "Flat plate of ceramic".

When the "Confirm" button 453 is operated while any option is selected, a transition to a screen for the selected setting information is made. In contrast, when the "Back" button 454 is operated, a transition back to the screen 450B is made.

Figure 10:
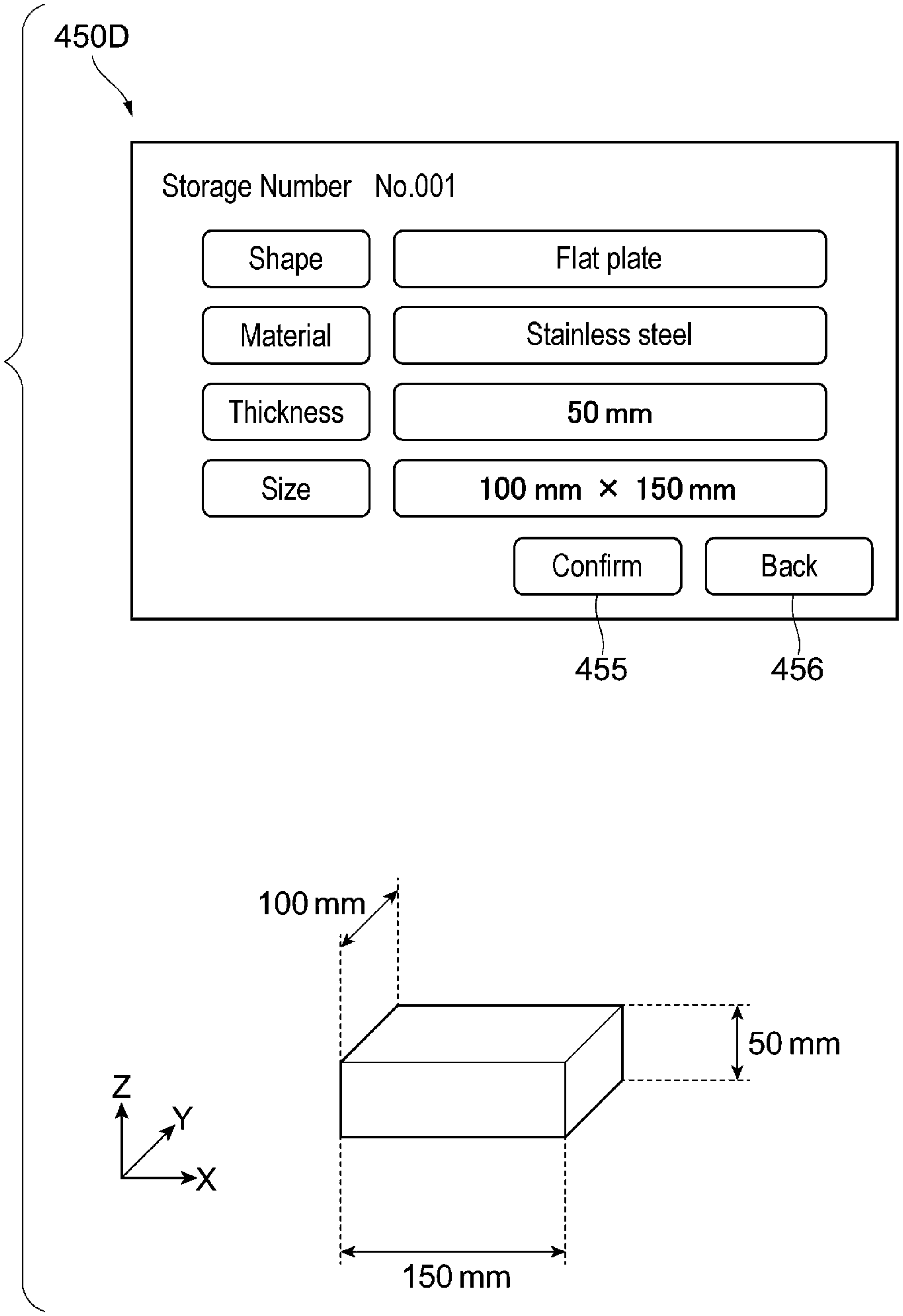
FIG. 10 is a diagram for describing exemplary display of registered setting information.

FIG. 10 is a diagram for describing exemplary display of registered setting information.

A screen 450D illustrated in FIG. 10 displays the setting information for the storage number, "No. 001".

The screen 450D describes that the "Shape" indicates a flat plate; the "Material" is stainless steel; the "Thickness" is 50 mm; the "Size" is 100 mm×150 mm.

The "Thickness" means the "height" in the Z-axis direction in figures. The first term of the "Size" indicates a length in the Y-axis direction, and the second term indicates a length in the X-axis direction.

Figure 11:
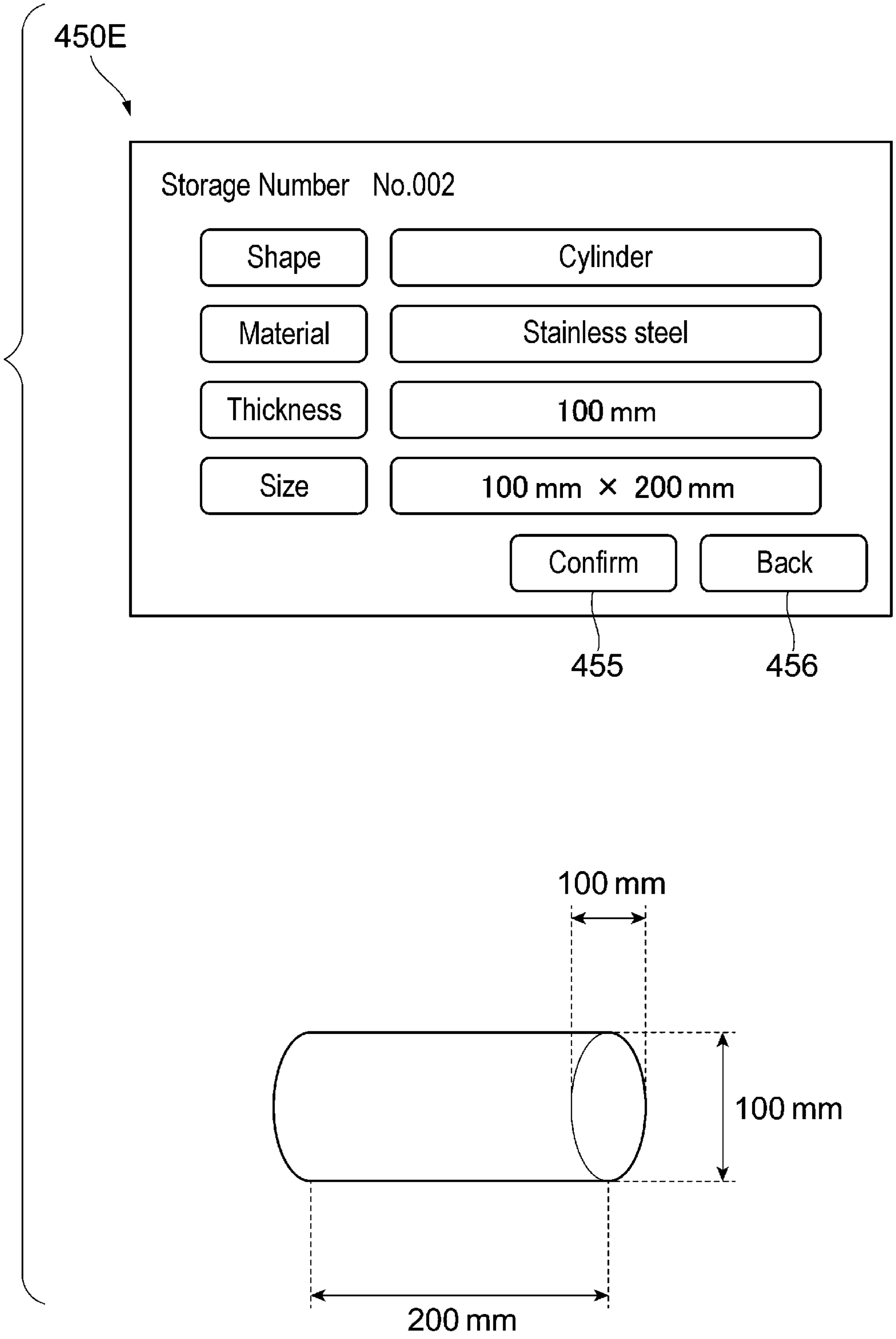
FIG. 11 is a diagram for describing other exemplary display of registered setting information.

FIG. 11 is a diagram for describing other exemplary display of registered setting information. FIG. 11 illustrates components corresponding to those in FIG. 10 by using the corresponding reference numerals.

A screen 450E illustrated in FIG. 11 displays the setting information for the storage number, "No. 002".

The screen 450E describes that the "Shape" indicates a cylinder; the "Material" is stainless steel; the "Thickness" is 100 mm; the "Size" is 100 mm×200 mm.

In the screens 450D and 450E, a "Confirm" button 455 for confirming use of the displayed setting information, and a "Back" button 456 for going back to the screen 450C are disposed.

The description will return to FIGS. 5A and 5B.

If a negative result is obtained in step 5, that is, in the case of a new entry to be registered, the processor 410 receives registration of medium information (step 6). In step 6, as illustrated in the screens 450D and 450E, the shape, the material, the thickness, the size, and other specifications are registered. In the first exemplary embodiment, it is assumed that a user inputs the types of information manually. Alternatively, information corresponding to a model number may be obtained through communication with an external database or the like which is used for publication of the specifications of media 500. Alternatively, corresponding information may be obtained through communication with a measuring device which measures the thickness and the size of a medium 500.

The processor 410 adjusts the elevation of the pedestal 322 so as to prepare image formation. Specifically, the processor 410 transports the medium 500 to a position under the transfer position (step 7), and adjusts the height of the top of the medium to the height of the transfer position (step 8).

Figure 12:
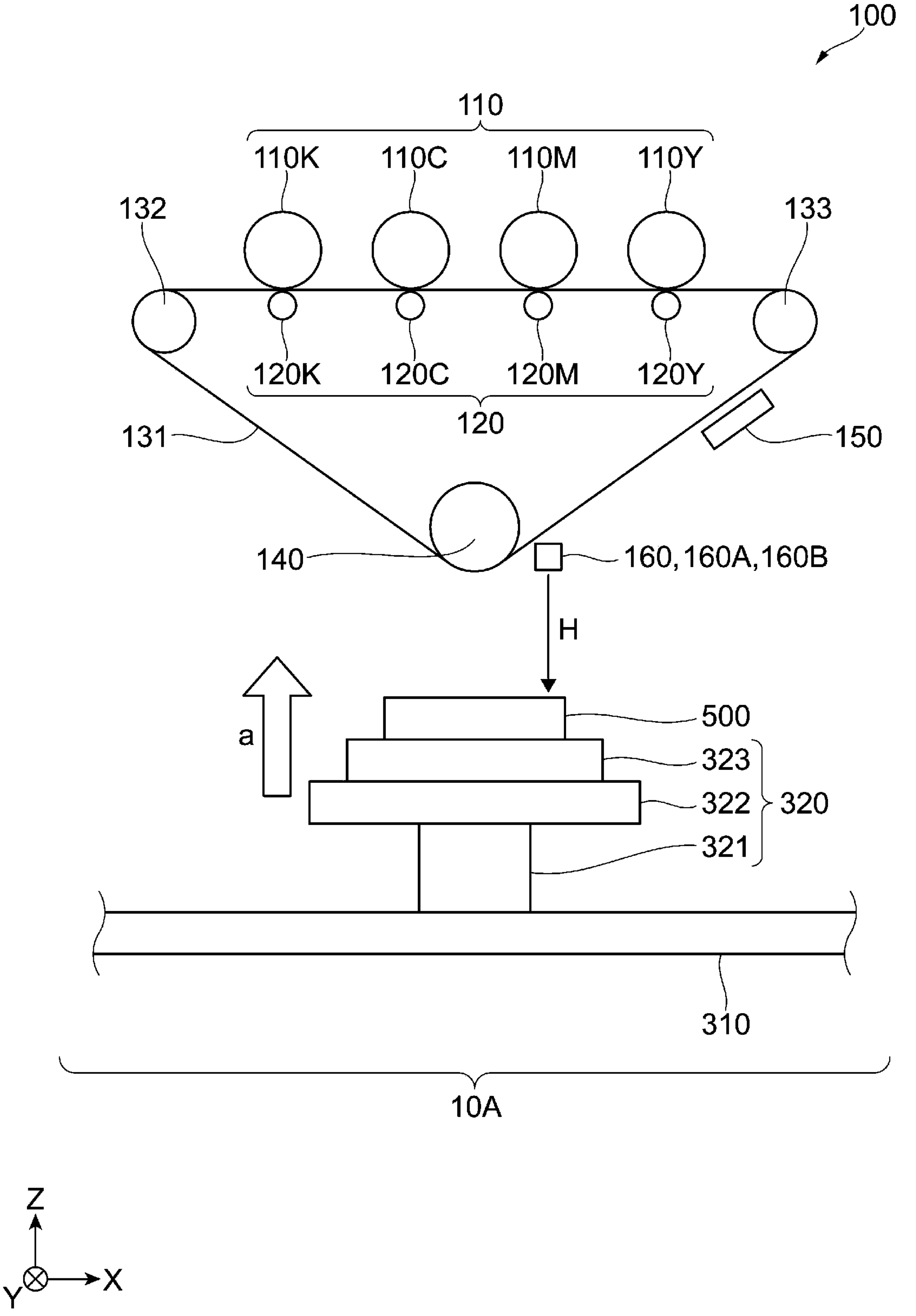
FIG. 12 is a diagram for describing an exemplary operation for adjusting the elevation of a pedestal.

FIG. 12 is a diagram for describing an exemplary operation for adjusting the elevation of the pedestal 322.

The adjustment of the elevation of the pedestal 322 is performed at a position where the pedestal 322 faces the intermediate transfer belt 131. Control has been exerted so that the elevation of the pedestal 322 before the adjustment is set to a transport height. The transport height is also used in the meaning of the height which is maintained when a medium 500 is transported in the horizontal direction in the housings.

When control is exerted so that the pedestal 322 is at the transport height, as illustrated in FIG. 12, the top of the medium 500 is not in contact with the lower end of the intermediate transfer belt 131. In the first exemplary embodiment, for example, the height in the case where the leg 321 is lowered to the lowermost end of its range of move is referred to as the "transport height".

In the height adjustment, the amount of raising the leg 321, which is required to bring the top of a medium 500 in contact with the lower end of the intermediate transfer belt 131, is determined. The determined amount of raising is stored in the RAM 430 (see FIG. 4) or the auxiliary storage unit 440 (see FIG. 4) as a control parameter dedicated to the medium 500.

The height of the uppermost surface of a medium 500 needs to be detected in determination of the amount of raising the leg 321.

In detection of the height of the uppermost surface of a medium 500, the height sensor 160, including a light emitting unit 160A and a light receiving unit 160B, is used.

The light emitting unit 160A in FIG. 12 emits laser light downward, and the light receiving unit 160B receives the laser light which is reflected from the surface of the medium 500. The height sensor 160 measures the time from emission of laser light to reception of the laser light, and thus measures the distance in the Z-axis direction from the height sensor 160 to the top of the medium 500.

The processor 410 calculates the distance in the Z-axis direction from the top of the medium 500 to the lower end of the intermediate transfer belt 131 on the basis of the distance in the Z-axis direction between the height sensor 160 and the lower end of the intermediate transfer belt 131.

The amount of raising the leg 321 is obtained from the difference between the height of the top of the medium 500 at the transport height and that obtained when the top of the medium 500 reaches the lower end of the intermediate transfer belt 131.

However, an image needs to be transferred in the state in which the medium 500 is pressed against the intermediate transfer belt 131 with a predetermined force. In other words, the surface of the medium 500 needs to be pressed against, or into, the intermediate transfer belt 131 so as to be in close contact with the intermediate transfer belt 131.

Therefore, in the first exemplary embodiment, the magnitude of a stress exerted on the leg 321 due to the contact between the medium 500 and the lower end of the intermediate transfer belt 131 is detected by using a pressure sensor or a strain sensor. The amount of raising at a time point of detection of a stress satisfying a reference is stored in association with the setting information.

Alternatively, a user may manually make a fine adjustment of the amount of raising the leg 321, and may store the value after the adjustment.

As in the case of a cylindrical medium 500 whose surface has different heights depending on measurement positions, it is required to adjust the medium 500's position in a horizontal plane in advance so that the top of the medium 500 is located within the measurement range of the height sensor 160.

The description will return to FIGS. 5A and 5B.

In contrast, if an instruction to use registered setting information is transmitted, the processor 410 receives selection of medium information (step 9). After that, the processor 410 determines whether the selected medium information matches information about the mounted medium 500 (step 10).

The thickness of the medium 500 mounted on the pedestal 322 is calculated, for example, from the difference between the height of the top measured by the height sensor 330 and the height of the mounting surface of the pedestal 322. In the case of use of the jig 323, the thickness of the medium 500 is calculated from the type of the jig 323 or other information. The determination in step 10 may be performed only when the thickness of the medium 500 may be measured or calculated.

If a negative result is obtained in step 10, a user is notified of the mismatch with the selected medium information (step 11), and the process returns to step 9.

Figure 13:
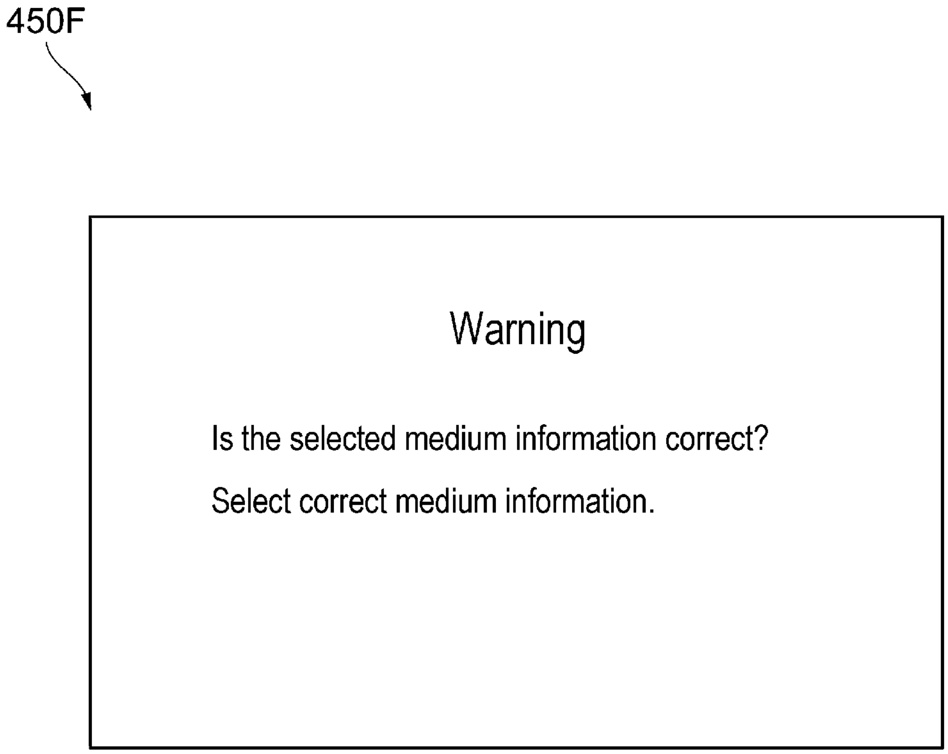
FIG. 13 is a diagram for describing an exemplary notification screen corresponding to step 11 in FIG. 5A.

FIG. 13 is a diagram for describing an exemplary notification screen 450F corresponding to step 11 (see FIG. 5A). The notification screen 450F is displayed, for example, on a display of the housing 10A.

In the example in FIG. 13, following a title, "Warning", messages, "Is the selected medium information correct?" and "Select correct medium information." are displayed The description will return to FIGS. 5A and 5B.

If step 8 is completed or a positive result is obtained in step 10, the amount of raising the leg 321, which is used in transfer of an image onto the medium 500, is determined.

The processor 410 transports the medium 500 to the preparation position (step 12).

When adjustment of the elevation of the medium 500, which is described in steps 6 to 8, has been performed, the processor 410 lowers the leg 321 to the transport height so that the medium 500 is not in contact with the intermediate transfer belt 131. After that, the medium 500 is transported to the preparation position.

In contrast, when registered setting information is to be used, the medium 500 is transported from the housing 10C to the preparation position while being maintained at the transport height.

Figure 14:
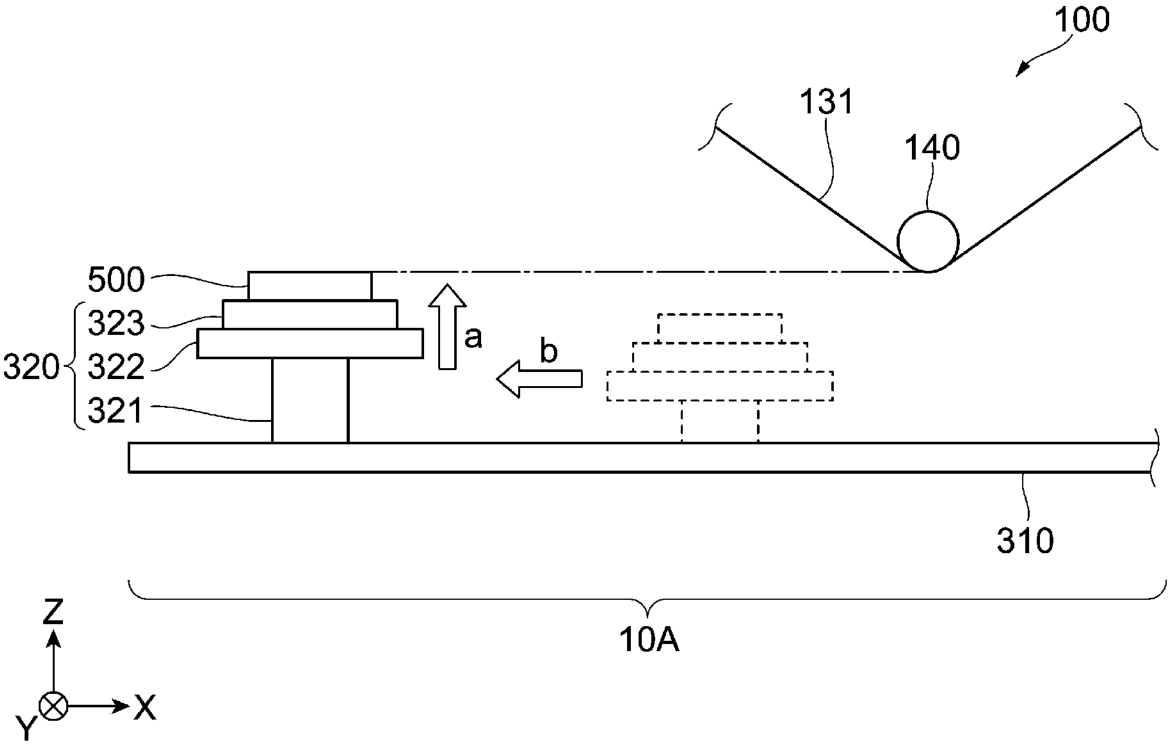
FIG. 14 is a diagram for describing a transport operation to a preparation position.

FIG. 14 is a diagram for describing a transport operation to the preparation position.

The medium 500, on which the height adjustment has been performed, is transported to the direction indicated by arrow b, and is stopped at a target position in the housing 10A.

After that, the leg 321 is raised by the amount of raising which is obtained through the adjustment in step 8 or the amount of raising which is read in selection in step 9. Then, preparation for image transfer is done.

The description will return to FIGS. 5A and 5B.

At this time point, the processor 410 in the first exemplary embodiment detects the height of the top of the medium 500 which is just ready to be moved to the transfer unit 100 (step 13).

This is because, if the height of the top of the medium 500 at the preparation position is higher than the height of the lower end of the intermediate transfer belt 131, the intermediate transfer belt 131 may be broken.

The processor 410 determines whether the detected height is greater than an upper limit (step 14). The upper limit is a value of the height of the lower end of the intermediate transfer belt 131 plus an allowance. The allowance is predetermined, for example, on the basis of empirical rules or a history of damage in the past.

If a negative result is obtained in step 14, that is, if the height of the top of the medium 500 is less than or equal to the upper limit, the processor 410 transfers the image onto the medium 500 (step 15).

Specifically, the medium 500 is transported in conjunction with image formation on the intermediate transfer belt 131. The images, which have been subjected to first transfer onto the intermediate transfer belt 131, are positioned at the lowermost point of the intermediate transfer belt 131 at the time point at which the medium 500 has been transported to the transfer position. While the medium 500 is transported in the horizontal direction, all the images are transferred onto the medium 500.

Figure 15:
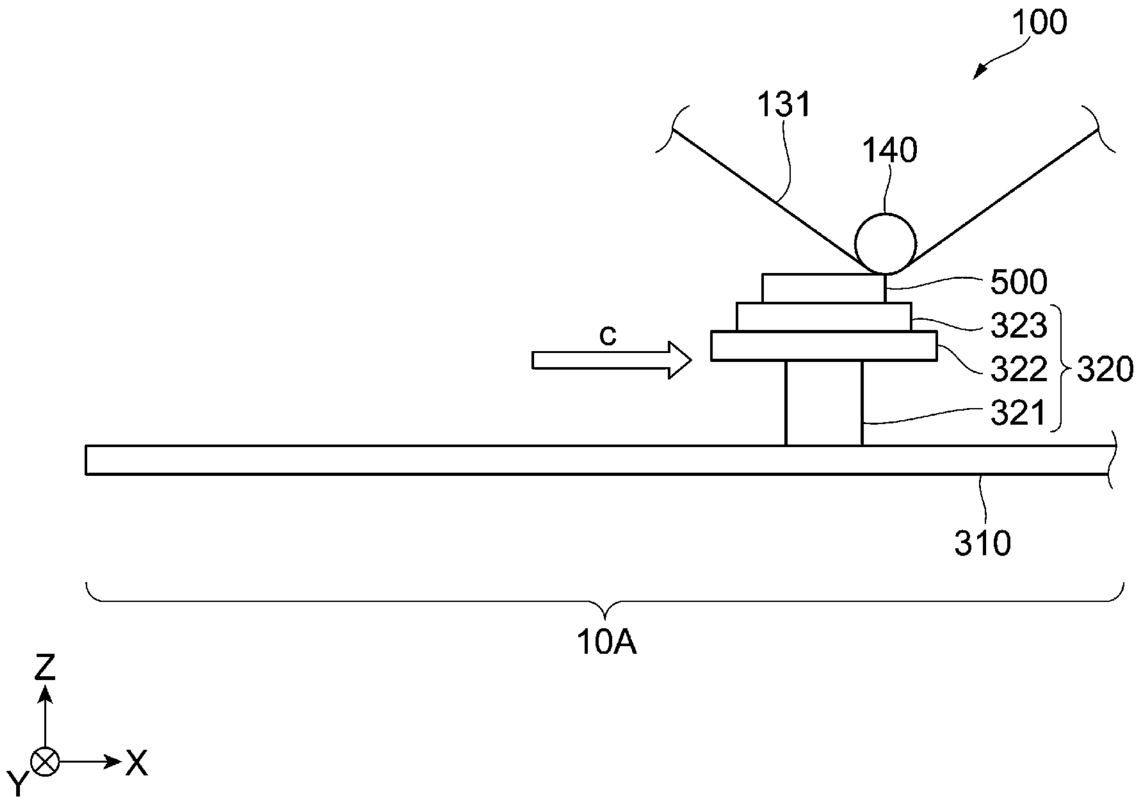
FIG. 15 is a diagram for describing a transfer operation.

FIG. 15 is a diagram for describing a transfer operation. In FIG. 15, parts corresponding to those in FIG. 2 are designated with the corresponding reference numerals.

As illustrated in FIG. 15, the height of the top of the medium 500 matches the lowermost point of the intermediate transfer belt 131. The transport speed of the medium 500 in the X direction is the same as the traveling speed of the intermediate transfer belt 131.

Upon completion of the image transfer, the processor 410 transports the medium 500, on which the image has been transferred, to the fixing unit 200 to fix the image with the temperature and time corresponding to the medium 500.

The description will return to FIGS. 5A and 5B.

After fixing the image, the processor 410 transports the medium 500 to the discharge position (step 16). Thus, image formation on a single medium 500 is completed. The medium 500, on which the image has been fixed, may be taken out from the housing 10C.

If a positive result is obtained in step 14, that is, if the height of the top of the medium 500 exceeds the upper limit, the processor 410 determines whether this is the first detection (step 17).

If a positive result is obtained in step 17, the processor 410 proceeds to step 8, and readjusts the top of the medium 500 to the height of the transfer position.

If a negative result is obtained in step 17, the processor 410 stops the transport to the transfer unit 100 (step 18). That is, image transfer is stopped. This is because a problem may occur in raising/lowering the leg 321.

Therefore, the processor 410 evacuates the medium 500 to the transport height, and transports the medium 500 to the take-out position (step 19). Then, the processor 410 notifies a user of poor adjustment of the elevation of the medium (step 20).

Figure 16:
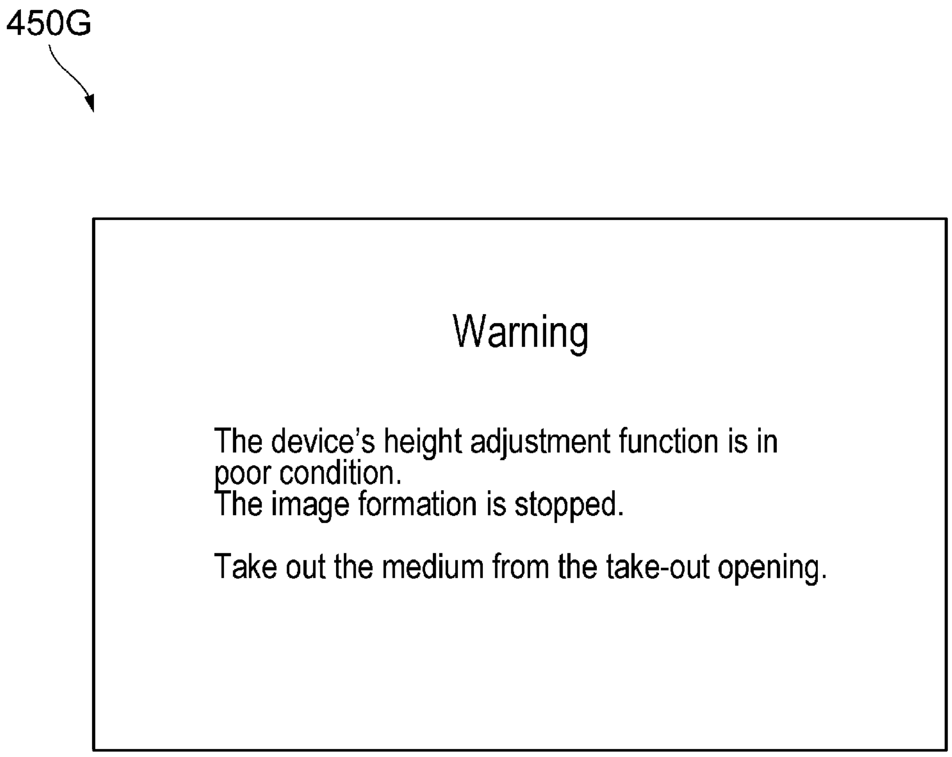
FIG. 16 is a diagram for describing an exemplary notification screen corresponding to step 20 in FIG. 5B.

FIG. 16 is a diagram for describing an exemplary notification screen 450G corresponding to step 20 (see FIG. 5B). The notification screen 450G is displayed, for example, on a display of the housing 10A.

In the example in FIG. 16, following a title, "Warning", messages, "The device's height adjustment function is in poor condition." "The image formation is stopped." "Take the medium out from the take-out opening." are displayed.

Then, the operation on a single medium 500 which is performed by the image forming apparatus 10 ends.

Other Exemplary Embodiments (1) The exemplary embodiment of the present disclosure is described above. The technical scope of the present disclosure is not limited to the scope described in the exemplary embodiment. It is clear, from the description about the claims, that an embodiment obtained by adding various changes or improvements to the exemplary embodiment is also encompassed in the technical scope of the present disclosure.

(2) In the exemplary embodiment described above, it is assumed that a medium 500 is a plate-shaped object or a cylindrical object. Alternatively, a medium 500 may be a ball, a frustum of a cone, or an object having another three-dimensional shape as long as the medium 500 has a standardized thickness and shape.

(3) In the exemplary embodiment described above, the material of a medium 500 is, for example, metal, glass, or ceramic. Alternatively, the material of a medium 500 may be, for example, cloth, paper, or plastic.

(4) In the exemplary embodiment described above, an opening is provided for the top surface of the housing 10C, and a medium 500 is mounted on or dismounted from the mount 320 through the opening. Alternatively, the opening may be formed on a side surface of the housing 10C.

(5) In the exemplary embodiment described above, the height sensor 330 is disposed in the housing 10C, into and out of which a medium 500 is taken, to detect whether the height of the top of the medium 500 mounted on the pedestal 322 exceeds the upper limit. Alternatively, the elevation of a medium 500 from the mounting surface of the pedestal 322 may be measured by receiving laser light reflected from the surface of the medium 500. In this case, for example, a linear image sensor may be used as the light receiving unit 330B.

(6) In the exemplary embodiment described above, the roll-up shutters 220, 230, and 240 are used. Alternatively, opening/closing doors or sliding doors may be used.

(7) In the exemplary embodiment described above, the roll-up shutters 220, 230, and 240 are used. Alternatively, curtains having the heat insulation property may be disposed.

(8) In the exemplary embodiment described above, the roll-up shutters 220, 230, and 240 are used. Alternatively, air outlets, through which air flows are produced along the openings 201 and 202, may be provided. That is, air curtains may be disposed in the openings 201 and 202. An air curtain may be provided between the heat source 210 and the heating chamber.

(9) In the exemplary embodiment described above, the electrophotographic system is employed for image recording. Alternatively, an inkjet system which ejects ink droplets onto the surface of a medium 500 may be employed. In this case, an ink head is an exemplary transfer unit 100. When an ink head is used as the transfer unit 100, height calibration is performed to avoid a collision between a medium 500 and the ink head.

(10) In the exemplary embodiment described above, the transporter 300 which moves the mount 320 along the transport rail 310 is used. Alternatively, a conveyor belt may be used to transport a medium 500. In formation of images on media 500 having various thicknesses and shapes, a raising/lowering mechanism which enables a conveyor belt to be raised or lowered in the vertical direction may be used in combination with the conveyor belt.

(11) In the exemplary embodiment described above, the position at which a medium 500 is mounted on the mount 320 and the position at which a medium 500 is dismounted from the mount 320 are provided on the same side with respect to the transfer unit 100. Alternatively, the position at which a medium 500 is mounted on the mount 320 and the position at which a medium 500 is dismounted from the mount 320 may be located with the transfer unit 100 interposed in between. In this case, an image is transferred and fixed while the mount 320 moves in one direction.

(12) In the exemplary embodiment described above, the transfer unit 100 and the fixing unit 200 are disposed side by side in the horizontal direction. Alternatively, the transfer unit 100 and the fixing unit 200 may be disposed side by side in the vertical direction.

(13) In the exemplary embodiment described above, the heat source 210 which heats the entire heating chamber is disposed in the fixing unit 200. Alternatively, a laser light source which heats a local portion of the surface of a medium 500, onto which toner or the like has been transferred, may be disposed. Alternatively, a fixing roller which is in contact with the surface of a medium 500, onto which toner or the like has been transferred, may be used. The fixing roller may be provided with a heat source.

(14) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

APPENDIX (((1)))

An image forming system comprising:
- a transfer unit that transfers an image onto an object;
- a transporter that transports the object in a horizontal direction;
- a raising/lowering unit that raises and lowers the object in a vertical direction; and
- a processor configured to:
  - after height adjustment performed by the raising/lowering unit, if the object has a top whose height is greater than a predetermined height when the object is to be transported to the transfer unit, stop the transport of the object to the transfer unit.

(((2)))

The image forming system according to (((1))), wherein the processor is configured to:
- when the height of the top of the object is detected and the detected height is greater than the predetermined height, transport the object to a take-out position.

(((3)))

The image forming system according to (((1))) or (((2))), wherein the processor is configured to:
- notify, through a notification unit, a worker that the object is not to be processed.

(((4)))

The image forming system according to any one of (((1))) to (((3))), wherein the processor is configured to:
- when the height of the top of the object having been adjusted by the raising/lowering unit to a transport height for transfer is detected and the detected height is greater than the predetermined height, instruct the raising/lowering unit to perform a readjustment.

(((5)))

The image forming system according to (((4))), wherein the processor is configured to:
- when the state in which the detected height is greater than the predetermined height is not resolved after the readjustment, transport the object to a take-out position in a state in which the top of the object is lower than a lowermost portion of the transfer unit.

(((6)))

The image forming system according to any one of (((1))) to (((5))), wherein the processor is configured to:
- notify a worker of poor height adjustment on the object.

What is claimed is:

1. An image forming system comprising:
- an ink head that transfers an image onto an object;
- a transporter that transports the object in a horizontal direction;
- a raising/lowering leg that raises and lowers the object in a vertical direction; and
- a processor configured to:
  - after height adjustment performed by the raising/lowering leg, if the object has a top whose height is greater than a predetermined height when the object is to be transported to the ink head, stop the transport of the object to the ink head,
  - when the height of the top of the object having been adjusted by the raising/lowering leg to a transport height for transfer is detected and the detected height is greater than the predetermined height, instruct the raising/lowering leg to perform a readjustment, and
  - when the state in which the detected height is greater than the predetermined height is not resolved after the readjustment, transport the object to a take-out position in a state in which the top of the object is lower than a lowermost portion of the ink head.

2. The image forming system according to claim 1, wherein the processor is configured to:
- notify a worker of poor height adjustment on the object.

3. An image forming system comprising:
- transfer means for transferring an image onto an object;
- transport means for transporting the object in a horizontal direction;
- raising/lowering means for raising and lowering the object in a vertical direction;
- stopping means for, after height adjustment performed by the raising/lowering means, if the object has a top whose height is greater than a predetermined height when the object is to be transported to the transfer means, stopping the transport of the object to the transfer means; and
- controlling means for, when the height of the top of the object having been adjusted by the raising/lowering means to a transport height for transfer is detected and the detected height is greater than the predetermined height, instructing the raising/lowering means to perform a readjustment, and when the state in which the detected height is greater than the predetermined height is not resolved after the readjustment, instructing the transport means to transport the object to a take-out position in a state in which the top of the object is lower than a lowermost portion of the transfer means.

* * * * *